Dec. 14, 1965  HANS-GEORG TRAEGER  3,223,406

DEVICE FOR PRODUCING THERMOELECTRIC BATTERY BLOCKS

Filed May 2, 1963

United States Patent Office 3,223,406
Patented Dec. 14, 1965

3,223,406
DEVICE FOR PRODUCING THERMOELECTRIC
BATTERY BLOCKS
Hans-Georg Traeger, Nurnberg, Germany, assignor to Siemens-Schuckertwerke Aktiengesellschaft, Berlin-Siemensstadt, Germany, a corporation of Germany
Filed May 2, 1963, Ser. No. 277,615
Claims priority, application Germany, May 12, 1962,
S 79,422
4 Claims. (Cl. 269—153)

My invention relates to the manufacture of thermoelectric battery blocks, such as multi-couple Peltier blocks for thermoelectric refrigeration.

Such blocks consist of rigid assemblies of thermocouples, each having two thermoelectrically different (p-type and n-type) legs, which are joined together in a regular pattern and electrically interconnected by bridge pieces of good conducting metal such as copper. Heretofore the battery blocks have been produced, as a rule manually, by placing the individual legs together with interposed insulating spacer pieces and to solder or hard solder (braze) the connecting bridge pieces to the legs in accordance with a given schematic connection diagram.

It is an object of my invention to facilitate and improve the accurate assembling and soldering of the components in the production of thermocouple battery blocks.

To this end, and in accordance with the invention, I provide an assembling and soldering device composed of a frame structure, two cross-wise groups of divider bars which form compartments for the respective thermocouple legs, a base for the frame structure, and a cover firmly attachable to the frame. More in detail, the divider bars are interengaged at their intersections and are alternately set back from the front and back of the frame so as to accommodate the bridge pieces to be soldered onto each two adjacent legs on each side of the frame opening. When the frame, subdivided by the bars, is open, the individual legs can be inserted into the respective compartments between the divider bars in the desired n-type, p-type sequence, and solder material in form of foil strips can then be placed on top of the leg faces before the bridge pieces are inserted and the completed block assembly in the frame is secured by attaching the cover, preferably by tightening it against the frame or base with the aid of screws. Thereafter the device and its content as a whole can be heated for soldering the component parts together in a single operation. The thermocouple block is then readily removable by disassembling the device.

According to further features of the invention, the above-mentioned cover is preferably provided with resiliently mounted pins which press against the connecting bridge pieces when the frame is filled and the cover attached. Furthermore, the mutually engaging divider bars are preferably subdivided longitudinally and hence across their width to facilitate pulling them out of the frame after soldering.

The foregoing and more specific objects and features of my invention will be apparent from the embodiment illustrated by way of example on the accompanying drawing and described presently. On the drawing.

A Peltier block of the type producible with the aid of the invention, is essentially a thermopile of electrically interconnected, usually series-connected, couples whose individual legs have alternately different thermo-forces. Thus, in the block shown in FIG. 6 (see FIG. 1), legs 3 of p-type conductance and legs 4 of n-type conductance alternate along an electric current path formed by interconnecting bridge pieces 1 and 6 of copper, each being soldered to the end faces of two immediately sequential n-type and p-type legs. When in use, the cold junctions of all thermocouples in the block are located at the same side, for example at the bridge pieces 1, and the hot junctions are all on the opposite side at bridge pieces 6. Suitable fins or other heat-exchange or heat-dissipation means may be joined with the pieces 1 and 6, depending upon the particular use intended; but these are not shown because they are not relevant to the present invention proper. Suitable material for the legs 3, 4 are known and likewise not essential to the invention. Applicable, for example, are bismuth-telluride compositions doped for p-type and n-type conductance respectively. For favorable p-type legs of $Bi_2Te_3$—$Sb_2Te_3$ mix-crystals and n-type $B_2Te_3$—$Bi_2Se_3$ mix-crystals reference may be had to the copending applications of J. Rupprecht, Serial No. 277,617, filed May 2, 1963, now abandoned, and Serial No. 277,618, filed May 2, 1963, both applications assigned to the assignee of the present invention.

Figure 1:
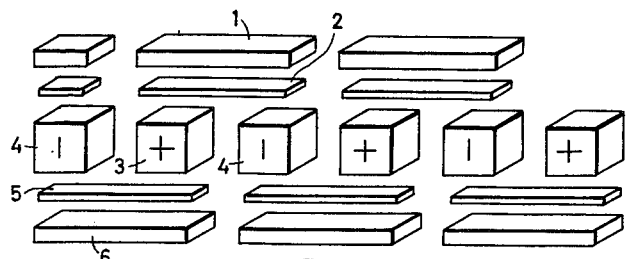
FIG. 1 is an exploded perspective view of a number of components to be assembled for producing a Peltier battery block.
Figure 6:
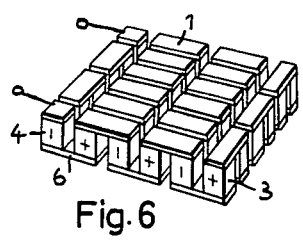
FIG. 6 is a perspective illustration of a completed Peltier block made with the aid of the device.

In the particular embodiment according to FIGS. 1 and 6, the individual legs 3 and 4 are prismatic or cubic and, in the finished block, are arranged in checkerboard fashion but mutually insulated by interspaces except at the two end faces joined with the bridge pieces 1 and 6. FIG. 1 shows only one of the rows of components used for producing the six-row block of FIG. 6. When the components are being assembled with the aid of the device still to be described, respective foil strips 2, 5 of solder material are placed beneath the bridge pieces 1 and 6. However, the end faces of the p-type and n-type legs may also be coated with solderable substance such as bismuth, in lieu of, or in addition to, using the solder foil strips.

Figure 3:
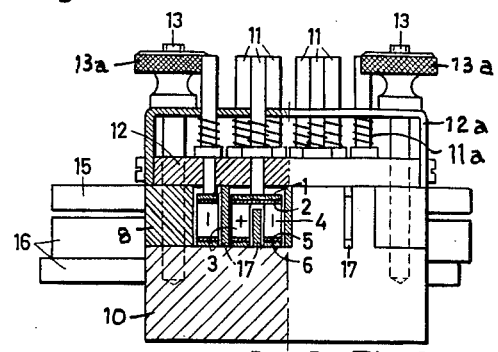
FIG. 3 shows the same device by a side elevation in the right-hand portion, and by a cross section in the left-hand portion of the illustration, the section being along the line III—III in FIG. 4.
Figure 4:
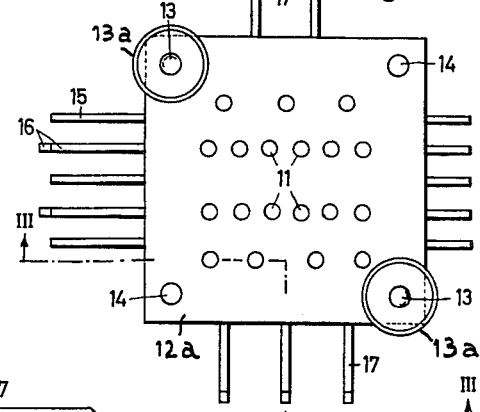
FIG. 4 is a plan view of the device.

The illustrated device comprises a frame structure (see FIGS. 2, 3 and 4), of square shape composed of two pairs of mutually opposite frame parts 8 and 9 which are joined together by two threaded pins 13 and two smooth guide pins 14. The pins are firmly joined with a base 10 and extend through respective bores in frame parts 8 and 9. The threaded portions of the two diagonally opposite pins 13 carry respective knurled nuts 13a.

The frame opening is covered at the bottom by the top surface of the base 10 and at the top by a cover plate 12 to which a bracket 12a is firmly attached. Displaceably mounted in respective bores of the cover plate 12 and the bracket 12a are pressure pins 11. Respective helical pressure springs 11a seated on the pins 11 tend to force the lower end of each pin downwardly out of the plate 12.

Figure 5:
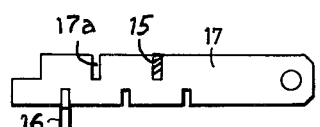
FIG. 5 shows separately one of the divider bars of the device.

The device is further provided with two groups of divider strips or bars 15, 16 on the one hand and 17 on the other hand. The bars in each group are parallel and spaced from each other, extending at a right angle to the dividers of the other group. The dividers 17 have notches 17a traversed by the dividers 15 and 16 as is apparent from FIG. 5. The two groups of dividers thus form a grid assembly which subdivides the frame space into a number of compartments each adapted for insertion of one of the thermocouple legs to be soldered together.

Figure 2:
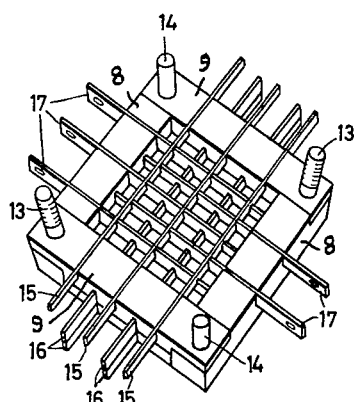
FIG. 2 is a perspective view of a device according to the invention.

The divider bars 15 are inserted from the top side into notches of the frame parts 9 (FIG. 2). The dividers 16 are inserted from the bottom side into notches of the same frame parts 9 which, as shown, may be subdivided in the longitudinal direction of each frame part. The divider bars 16 preferably consist of two longitudinally extending separate and distinct bar portions. The dividers 17 are inserted into notches of the two frame parts 8 from the top of the frame structure.

When the frame structure and the strips are assembled, the thermocouple legs 3, 4 are placed into the compartments in the proper sequential order corresponding to the particular schematic connection diagram used. Then the solder strips 2 and 5 are inserted from both sides so that each extends over the coplanar faces of two adjacent legs of respectively different type of conductance. For example, such a strip 2 is inserted between each two of the dividers 15 according to FIG. 2. Thereafter the connecting bridges 1 and 6 of copper are inserted in the same manner, whereafter the device is closed by attaching the cover and tightening it with the aid of the knurled nuts 13a. The pins 11 are then spring-biased against the bridge pieces 1 and securely hold these pieces and the other components in the proper position. Simultaneously the components are kept in properly spaced relation to one another due to the interposition of the divider bars.

Disassembly of the device after a block is soldered takes place as follows:

By suitably loosening the knurled nuts 13a, the bracket 12a and cover plate 12 are removed. The lower bar portion of the dividers 16 is then drawn out sidewise in the direction of its longitudinal axis and the upper portion of the dividers 16 is then forced downwardly into the slot formed in the base 10 previously occupied by the lower portion of the dividers 16. The upper portions can then either remain in the respective slots of base 10 or can be drawn out sidewice, since they are no longer anchored by their upper slots to the cross dividers 17. The dividers 15 are subsequently withdrawn in an upward direction as viewed in FIG. 3, since there is no longer any upper obstruction after removal of the cover plate 12 and bracket 12a. The five cross dividers 17 are then drawn out either upwardly or sidewise since they are no longer held in place by the dividers 15 and 16 which have been removed from the slots formed in the dividers 17. The soldered block then lies freely within the frame and can be removed from the form after the frame base 10 is disengaged from the frame parts 8, 9.

The components of the device consist of metal and withstand the soldering temperature to be applied. All components can be soldered simultaneously in a single operation simply by heating the entire device with its contents, for example in a furnace. The production is particularly simplified by heating one or simultaneously several soldering devices on a heating plate. After completion of the soldering operation, a rapid cooling, desirable for some soldering methods, can thus readily be applied. The removal of the soldered thermocouple block from the device is facilitated by the individual dividers 16, the two bar portions of which can successively be pulled out of the frame structure. After removing the soldered block, it can be provided around its perimeter and/or in the insulating spaces between the legs with a protective coating or may be surrounded with a preferably transparent envelope of synthetic plastic poured or cast into the spaces or around the block. If desired, the surfaces of the bridge pieces 1, 6 can be ground to obtain an accurately planar shape for improved contact engagement with any heat-exchanging structures to be joined therewith.

To those skilled in the art, it will be obvious upon a study of this disclosure, that devices according to my invention can be modified in various respects and can be adapted to thermoelectric battery blocks composed of a different number of legs or of differently shaped legs or having a different arrangement of the legs, and can thus be given embodiments other than particularly mentioned herein, without departing from the essential features of the invention and within the scope of the claims annexed hereto.

I claim:

1. A device for assembling and soldering thermocouple battery blocks from a multiplicity of n-type and p-type legs and connecting bridge pieces, comprising a rigid frame structure having a frame opening which defines the perimetric size and shape of the multi-leg block to be produced; two groups of elongated divider bars removably assembled with said frame and extending through the frame space in transverse direction to each other, each group comprising a plurality of parallel dividers in engagement with those of the other group at the respective intersections so as to partition the frame space into a plurality of compartments in checkerboard-type arrangement and adapted to receive the respective thermocouple legs, said dividers being alternately offset inwardly in the assembled condition so as to accommodate the bridge pieces to be soldered onto each two adjacent legs on each side of the frame opening, the divider bars of at least one of said groups being divided respectively into a plurality of parts extending in the longitudinal direction of the respective divider bars of said one group, said parts of said divider bars respectively being slidable sequentially in said respective longitudinal direction out of said frame space for disassembling the device; a base beneath the frame structure for supporting the legs and bridge pieces when placed into the frame structure; and a cover with fastening means on top of the frame structure for closing the frame and retaining the inserted legs and bridge pieces.

2. A device for producing thermocouple battery blocks according to claim 1, comprising pins displaceably mounted on said cover for movement against said bridge pieces when said device is in use, and spring means urging said respective pins relative to said cover toward the interior of said frame.

3. A device for assembling and soldering thermocouple battery blocks from a multiplicity of n-type and p-type legs and connecting bridge pieces, comprising a rigid frame structure having a frame opening which defines the perimetric size and shape of the multi-leg block to be produced; two groups of elongated divider bars removably assembled with said frame and extending through the frame space in transverse direction to each other, each group comprising a plurality of parallel dividers in engagement with those of the other group at the respective intersections so as to partition the frame space into a plurality of compartments in checkerboard-type arrangement and adapted to receive the respective thermocouple legs, said dividers being alternately offset inwardly in the assembled condition so as to accommodate the bridge pieces to be soldered onto each two adjacent legs on each side of the frame opening, the divider bars of at least one of said groups being slidable in the direction of their respective longitudinal axes out of said frame space for disassembling the device, said divider bars of said one of said groups each consisting of a pair of separate longitudinally extending bar portions successively slidable in said direction of their longitudinal axes out of said frame space; a base beneath the frame structure for supporting the legs and bridge pieces when placed into the frame structure; and a cover with fastening means on top of the frame structure for closing the frame and retaining the inserted legs and bridge pieces.

4. In a device for producing thermocouple battery blocks according to claim 3, wherein one of said bar portions is formed with a plurality of transverse slots for receiving the divider bars of said other of said groups and is movable in the direction of said slots when the other of said bar portions is slid out of said frame space so as to disengage said one of said bar portions from the divider bars of said other of said groups.

References Cited by the Examiner

UNITED STATES PATENTS

| | | | |
|---|---|---|---|
| 2,289,152 | 7/1942 | Telkes | 62—3 |
| 2,749,716 | 6/1956 | Lindenblad | 136—4.2 |
| 2,980,746 | 4/1961 | Claydon | 29—155.5 |
| 3,053,969 | 9/1962 | Kerr et al. | 113—99 |
| 3,111,813 | 11/1963 | Blumentritt | 62—3 |

WHITMORE A. WILTZ, *Primary Examiner.*

CHARLES W. LANHAM, *Examiner.*